United States Patent [19]

Dundon

[11] 4,115,171

[45] Sep. 19, 1978

[54] RETREADING STACKED TIRES

[75] Inventor: Michael J. Dundon, Muscatine, Iowa

[73] Assignee: Bandag Incorporated, Muscatine, Iowa

[21] Appl. No.: 724,766

[22] Filed: Sep. 20, 1976

[51] Int. Cl.² ............................................. B29H 17/00
[52] U.S. Cl. ...................................... 156/96; 156/112;
156/394; 254/150 R; 425/18
[58] Field of Search ..................... 156/94, 95, 96, 112,
156/128, 394, 153, 285, 286, 382; 425/14, 17,
18, 22; 254/150 R, 152, 163, 164

[56] References Cited

U.S. PATENT DOCUMENTS

| 1,330,128 | 2/1920 | Long ....................................... 156/96 |
| 2,014,010 | 9/1935 | Wheatley ................................ 425/18 |
| 2,608,383 | 8/1952 | Edelblute ............................... 254/164 |
| 2,709,471 | 5/1955 | Smith et al. ........................... 156/112 |
| 2,864,585 | 12/1958 | Gschwind ............................ 245/152 |
| 2,989,779 | 6/1961 | White ..................................... 156/96 |
| 3,236,709 | 2/1966 | Carver ................................... 156/96 |
| 3,727,886 | 4/1973 | Cain ....................................... 254/164 |
| 3,884,739 | 5/1975 | Hindin et al. ......................... 156/96 |
| 3,917,440 | 11/1975 | Huebert ................................ 425/18 |
| 3,989,428 | 11/1976 | Cox ....................................... 425/18 |
| 4,028,168 | 6/1977 | Wolfe .................................... 425/18 |

*Primary Examiner*—John E. Kittle
*Attorney, Agent, or Firm*—Cushman, Darby & Cushman

[57] ABSTRACT

A plurality of solid tires are retreaded simultaneously in a stacked configuration in an autoclave or the like. Each tire periphery is provided with a U-shaped cover which engages and seals with the rims or shoulders of the tire. The sealing is effected by placing rigid plates between tires and compressing the stack vertically with an internal tension device, the edges of the envelopes being compressed between the plates and the respective tire rims or shoulders.

8 Claims, 3 Drawing Figures

RETREADING STACKED TIRES

This invention relates to a method and apparatus for retreading solid rubber tires with pre-cured tread strips.

BACKGROUND OF THE INVENTION

In the retreading art it is known to bond a pre-cured rubber tread strip to a tire periphery with a rubber-based bonding medium which vulcanizes when heat and pressure are applied to the assembly of tire and tread strip. It is also known, as disclosed in U.S. Pat. No. 3,884,739, to retread a plurality of enveloped tires by stacking them vertically on a base with sealing elements disposed between the tires, placing the assembly of stacked tires in an autoclave and effecting seals between the envelopes and their respective tire shoulders by inflating the tires so as to compress the stack between the base and an upper wall of the autoclave.

SUMMARY OF THE INVENTION

According to the principles of the present invention solid (non-inflatable) rubber industrial tires with pe-cured tread strips applied to their peripheries the tires are provided with U-shaped flexible envelopes over the treads and rims or shoulders, arranged in a stack with divider plates therebetween so as subequently to form seals between the envelopes and tire shoulders, and compressed vertically with an internal tension device. Air is withdrawn by suction from the spaces between the envelopes and the tires, and the assembly is subjected to heat and fluid pressure in an autoclave to effect vulcanization of a rubber-base bonding material disposed between the tire peripheries and the tread strips.

The apparatus includes a platform on which the enveloped tires are stacked and a tensioning device carried by the platform which is adapted to pull downwardly on the uppermost plate so as to compress the stack. A preferred tensioning device is a cable and a ratchet-operated drum located below the tire-supporting surface of the platform. The cable extends though a central aperture in the platform and upwardly through the stacked tires and is releasably connected to the uppermost plate. A spring load assembly disposed between the end of the cable and the uppermost plate assists in applying the desired tension to the plate.

DETAILED DESCRIPTION

The invention will be further understood from the following detailed description of an exemplary embodiment taken with the drawings in which.

Figure 1:
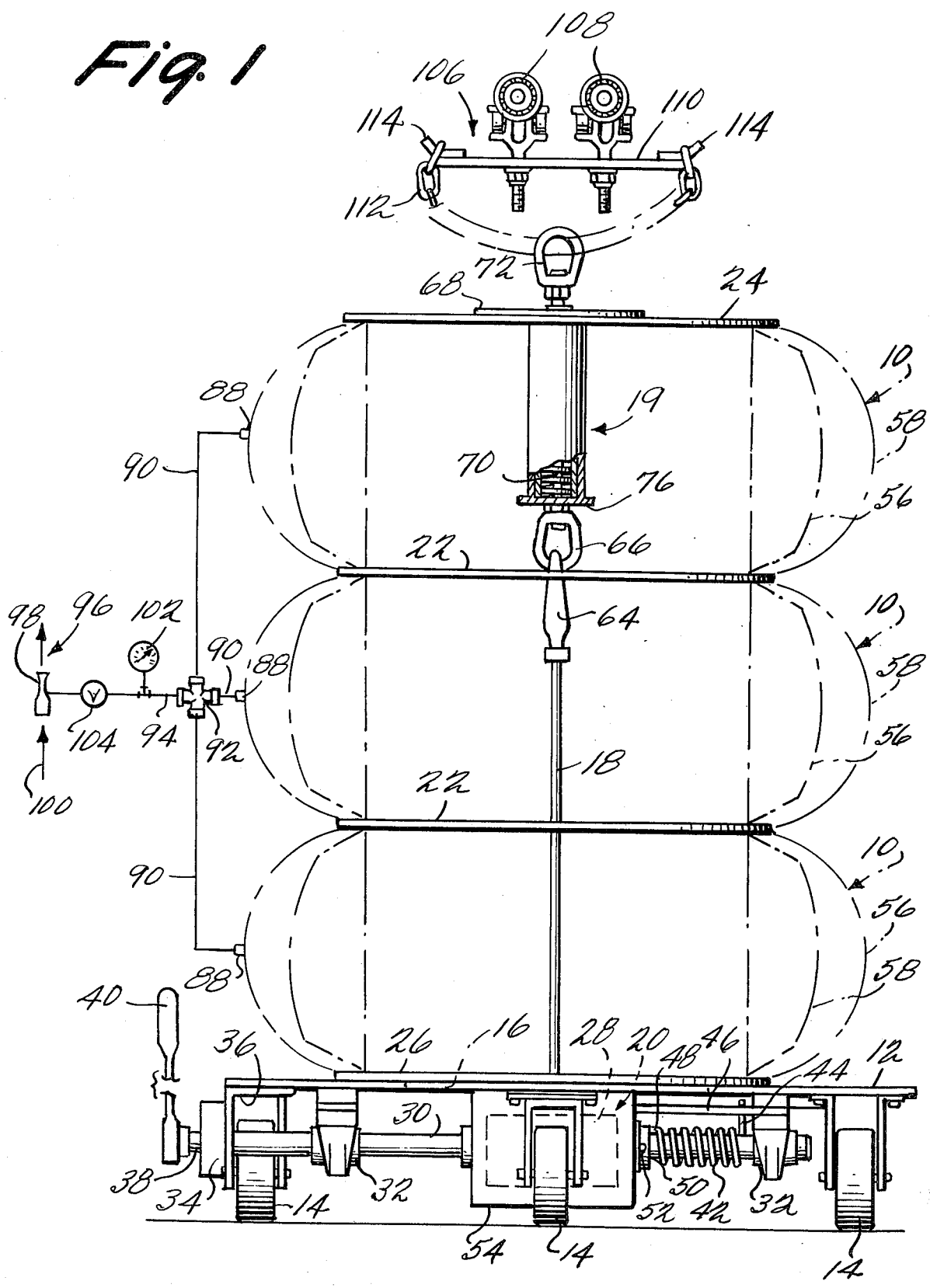
FIG. 1 is an elevational view of a tire stacking apparatus, with the tires illustrated schematically.
Figure 3:
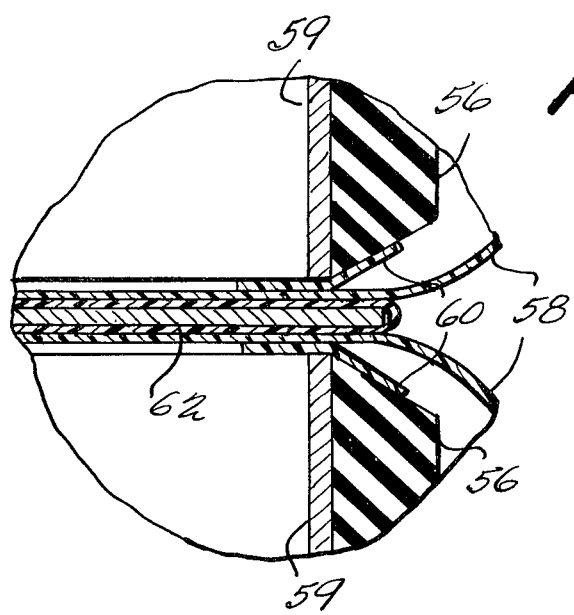
FIG. 3 is a fragmentary view, on an enlarged scale, illustrating the relationship between a tire and a plate in FIG. 1.

Referring to FIG. 1 there is shown a stack of three tires 10, illustrated schematically, in combination with the stacking apparatus of the invention. The stacking apparatus includes a rigid support platform 12 or bed plate the upper surface of which supports the lowermost tire and the lower surface of which carries a plurality of floor-engaging wheels 14. A central hole 16 in the support 12 permits a cable 18, which is part of a tensioning device 20 for compressing the stacked tires 10, to pass upwardly through the tires 10. An annular divider plate 22 is disposed between each two tires, and similar annular top and bottom plates 24 and 26 are disposed at opposite ends of the stack. The cable 18 when tensioned applies a downward pull on a spring load assembly 19 which is detachably connected to the top plate 24.

The tensioning device 20 includes a drum 28 on which the cable 18 is wound, the drum 28 being fixed to a horizontal rotatable shaft 30 which is mounted in bearings 32 fixed to the under surface of the support 12. The left end of the shaft 30 is connected to a clutch and ratchet assembly 34 which is fixed to an angle bracket 36 mounted on the under surface of the support 12. Extending from the clutch and ratchet assembly 34 is a stub shaft 38 which can be rotated by means of an upwardly extending handle 40 detachably connected to the stub shaft 38. The right end of the shaft 30 carries a spiral torsion spring 42 one end 44 of which is secured to a fixed member 46 and the other end 48 of wich is fixed to a collar 50 which in turn is fixed to the shaft 30 by a set screw 52. A cylindrical cover 54 surrounds the drum 28 and is provided with a longitudinal slot (not shown) which serves as a guide for the cable 18.

When the apparatus described above is to be used each tire 10 is first prepared for retreading in the normal way by applying to its buffed periphery a strip of pre-cured tread 56 with a layer of vulcanizable bonding composition (not shown) interposed between the tread 56 and the tire periphery. In the illustrated embodiment the tire 10 is illustrated as being a solid rubber tire which after buffing has the form of a solid cylinder or band of rubber. Next the tire and tread assembly is placed in an annular flexible rubber envelope 58 of U-shaped cross-section, this being a known operation in the retreading art.

Then an annular heavy rubber sheet, such as a truck tire flap 60, is tucked around each shoulder of the tire and between the shoulder and the envelope 58. The flaps should be no larger than the outside diameter of the retreaded tire and no smaller than one inch less than the outside diameter of the retreaded tire. The presence of the flaps 60 during subsequent compression provides cut protection for the envelope 58 and compression rubber to seal any indentations in the wheel band 59.

Stacking of the thus-enveloped tires on the support 12 is performed by placing the bottom plate 26 on the support 12, stacking the enveloped tires alternately with the intermediate plates 22 and placing the top plate 24 on the uppermost tire. The plates 22, 24 and 26 may be identical, and each is provided with a soft flexible cover 62. As each tire is placed on top of the previous one the cable 18 is manually pulled up through the tire center and through the annular plate 22 and is temporarily attached to the inner edge of the plate 22 by means of a hook 64 which is secured to the end of the cable 18. The torsion spring 42 maintains a low but positive tension in the cable 18 at this time. When the top plate 24 has been placed in position, the spring load assembly 19 is brought into proximity with the plate 24 and the hook 64 is placed in an eye 66 on the lower end of the spring load assembly 19. The assembly 19 is then lowered into the stack until a plate 68 forming part of the assembly 19 comes to rest on the upper surface of the plate 24.

Figure 2:
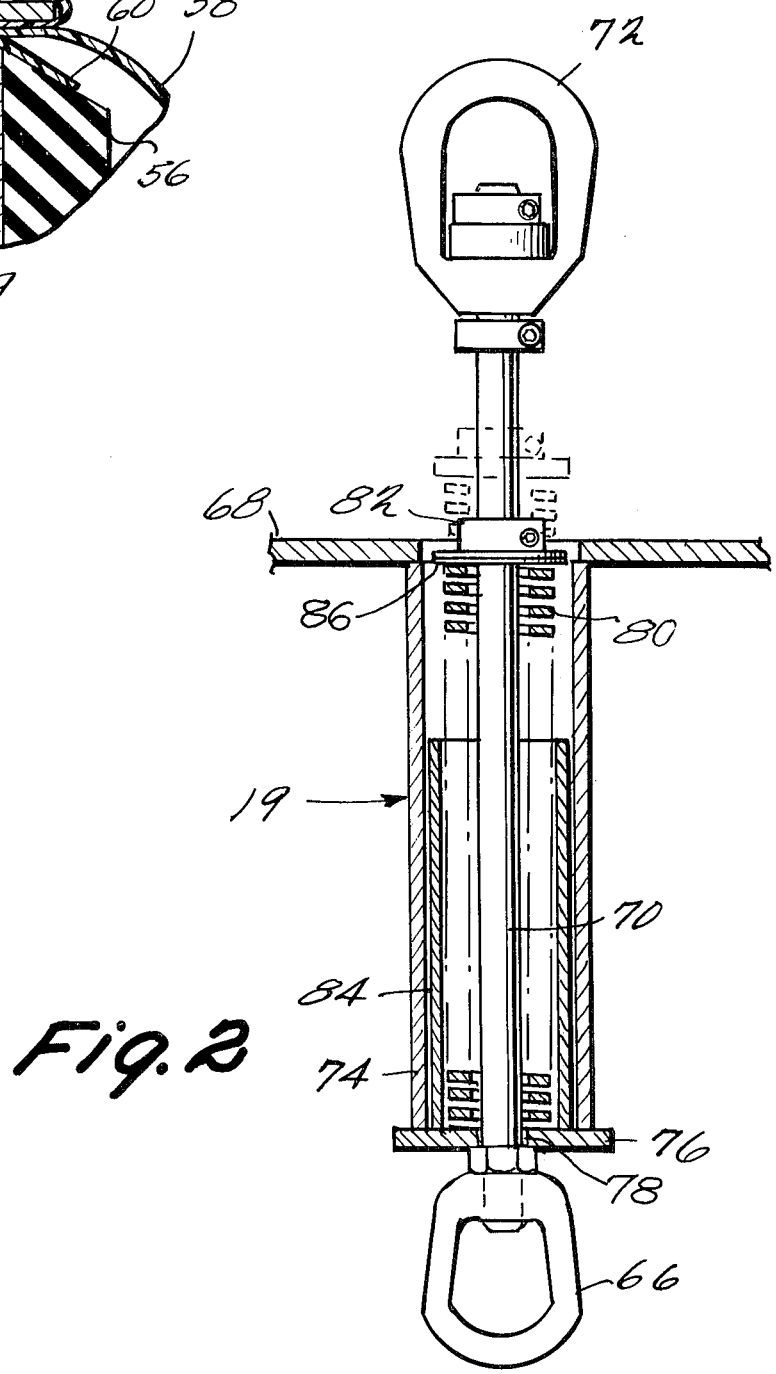
FIG. 2 is an elevational view on an enlarged scale, of the spring load assembly which is a part of the apparatus of FIG. 1.

As shown in FIG. 2 the spring load assembly 19 includes a central rod 70 which carries the eye 66 at its lower end and another eye 72 at its upper end. The rod 70 is surrounded by a sleeve 74 which is fixed at its upper end to the plate 68 as by welding. A smaller plate is welded to the lower end of the sleeve 74 and is provided with a hole through which the rod 70 is slidable. Within the sleeve 74 is a compression spring 80 which is compressed between the plate 76 and a collar 82 threaded on the rod 70. The position of the collar 82 along the length of the rod determines the amount of compression in the spring 80. An inner sleeve 84 which surrounds the spring 80 is secured at its lower end to the plate 76. The inner sleeve 84 serves as a stop to limit the extent of downward movement of the rod 70, when a washer 86 which is carried between the upper end of the spring 80 and the collar 82 engages the upper end of the inner sleeve 84.

When the handle 40 is swung in the appropriate direction about the axis of the stub shaft 38, the ratchet assembly 34 turns the shaft 30 in a direction to wind the cable 18 on the drum 28, and the cable 18 pulls down on the lower end of the rod 70 thereby transmitting a downward force through the parts 76, 74 and 68 to the plate 24. The rod 70 moves downward against the action of the spring 80, thereby applying increasing compression to the stack of tires. When the washer 86 engages the upper end of the inner sleeve 84, the operator can feel the resistance and ceases operating the handle 40. At this time a predetermined compression of the tires 10 has been accomplished. This compression results in the formation of an essentially air-tight seal between each envelope 58 and its respective tire 10. The handle 40 is then removed from the end of the stub shaft 38.

The air space between each envelope 58 and its respective tire 10 is then subjected to a vacuum in order to remove the air. For this purpose each envelope 58 includes a valve stem 88 or similar connection through which a vacuum can be drawn. In the illustrated embodiment a flexible line 90 leads from each valve stem 88 to a manifold 92, and a line 94 leads from the manifold 92 to a suction device 96. The suction device 96 includes an internal venturi nozzle 98 which receives a stream of compressed air from an air line 100, the line 94 being connected to the low pressure area of the venturi 98. The line 94 is provided with a vacuum gauge 102 which indicates to the operator the degree of vacuum in the system. A manual valve 104 between the suction device 96 and the vacuum gauge 102 is closed by the operator when the desired vacuum is attained. If the pressure in the system remains constant after the valve 104 has been closed, or rises only very slowly, the stack of tires is ready to be placed in an autoclave (not shown). The manifold 92, line 94, gauge 102, valve 104 and suction device 96 may conveniently be a single light-weight assembly which can be connected to the exhaust lines 90 and to the air supply line 100 by the operator as needed. The manifold 92 may of course have more than the illustrated number of parts, and if it has more parts than are needed for a particular job the extra parts can be connected to extra exhaust lines 90 which in turn have removable plugs in their free ends.

The manner in which the stacked tires are placed in an autoclave is not critical. In the illustrated embodiment the entire assembly of tires, plates and support 12 may be suspended from a carriage assembly 106 which includes rollers 108 adapted to engage an elevated rail disposed in a horizontally elongated autoclave. The carriage may include a base plate 110 and a chain 112 passed through the upper eye 72 of the spring assembly 19 and connected at its ends to the base plate 110. The end links of the chain 112 are shown as being hooked over ears 114 on the base plate After the stack of tires 10 has been subjected to heat and external fluid pressure in an autoclave for a time sufficient to vulcanize the bonding medium and thereby bond the treads 56 to the tires 10, the stack is removed from the autoclave and allowed to cool. The handle 40 is replaced on the end of the stub shaft 38 and is swung in a direction to rotate the drum 20 in a cable-unwinding direction. This loosens the cable 18 and allows the spring 80 to raise the rod 70 to a position in which the lower eye 66 engages the plate 76. The entire spring assembly 19 is then raised upwardly, by hand, until the lower eye 66 and the hook 64 can be manually disconnected, thereby permitting the spring assembly 19 to be removed and stored for future use. The torque being applied to the shaft 30 by the torsion spring 42 now winds up the cable 18 on the drum 28 as the operator guides the hook 64 down through the center of the stack of tires. The lines 90 are disconnected from the valve stems 88 and the enveloped tires and the plates 22, 24 and 26 are removed from the support 12. The envelopes 58 and flaps 60 are removed from the retreaded tires 10.

What is claimed is:

1. A method of preparing tires for retreading comprising: applying to the periphery of each tire a pre-cured tread strip with a vulcanizable bonding medium disposed between the tire periphery and the tread strip; applying an annular U-shaped envelope to the periphery of each tire so that the edge portions of the envelope overlie the rim or shoulder portion of the tire; stacking the tires vertically on a support with a plate disposed between each two adjacent tires, the plates engaging the edge portion of the envelopes; placing a top plate on the upper surface of the uppermost tire; connecting a tensioning device between the top plate and the support to compress the stack thereby sealing each tire to the edge portions of its respective envelope; while the stack is compressed, applying suction to the space between each tire and the inner surface of its respective envelope, to remove air from said space; and thereafter placing the assembly of stacked tires and plates in an autoclave.

2. A method as in claim 1 including the step of placing an annular protective flap between each tire rim or shoulder and the overlying edge portion of the respective envelope.

3. A method as in claim 1 wherein the suction is applied by aspiration with a stream of compressed air.

4. A method as in claim 1 wherein the stack is compressed by applying tension to a cable extending between the support and the top plate.

5. Apparatus for preparing a plurality of stacked tires for retreading and insertable with its stacked tires in an autoclave, comprising: a mobile support having ground-engaging wheels and having an upper surface for supporting a vertical stack of tires thereon, each of said tires having a pre-cured tread strip applied to its periphery with a layer of vulcanizable bonding material therebetween and each tire and tread assembly being provided with a U-shaped envelope covering the tread strip and having edge portions overlying the rims or shoulders of the tire; a horizontal plate disposed between each tire and the neighboring tires and a top plate overlying the uppermost tire, the edge portions of each envelope being thereby pressed against the rim or shoulder portions of the respective tire; a tension device connected between said support and said top plate for forcing said top plate toward said support to thereby effect a seal between the edge portions of each envelope and the rim or shoulder portions of the respective tire; and a manifold assembly including a branch line connected to the space between each envelope and its respective tire and tread, a suction line connectable to a suction source for applying suction to each branch line and a valve for closing the suction line.

6. Apparatus as in claim 5 wherein said tension device includes a drum mounted on said support for rotation about its axis and a flexible line wound on said drum and having a free end connectable with said top plate.

7. Apparatus as in claim 5 wherein said tension device includes a loaded compression spring surrounding a vertical rod and disposed with its upper end engaging a stop on the rod and its lower end arranged to transmit downward force to said upper plate when a downward force is applied to said rod.

8. A method of preparing tires for retreading comprising applying to the periphery of each tire a precured tread strip with a vulcanizable bonding medium disposed between the tire periphery and the tread strip; applying an annular U-shaped envelope to the periphery of each tire so that the edge portions of the envelope overlie the rim or shoulder portion of the tire; stacking the tires vertically on a support with a plate disposed between each two adjacent tires, the plates engaging the edge portion of the evelopes; placing a top plate on the upper surface of the uppermost tire; connecting a tensioning device between the top plate and the support to compress the stack thereby sealing each tire to the edge portions of its respective envelope; and thereafter placing the assembly of stacked tires and plates in an autoclave.

* * * * *